United States Patent [19]
Hayashi

[11] 4,347,139
[45] Aug. 31, 1982

[54] MEMBRANE FOR REVERSE OSMOSIS AND METHOD OF MAKING THE SAME

[75] Inventor: Yoshihiro Hayashi, Kyoto, Japan
[73] Assignee: Juichiro Ozawa, Japan
[21] Appl. No.: 132,848
[22] Filed: Mar. 24, 1980
[51] Int. Cl.³ .............................................. B01D 13/00
[52] U.S. Cl. ................... 210/654; 210/500.2; 264/22
[58] Field of Search ............... 210/652, 653, 321.1, 210/490, 500.2, 654; 204/165, 168, 296; 264/22; 427/36, 40–41, 402, 412.2, 419.8

[56] References Cited

U.S. PATENT DOCUMENTS

| | | | |
|---|---|---|---|
| 3,775,308 | 11/1973 | Yasuda | 210/500.2 X |
| 3,847,652 | 11/1974 | Fletcher | 210/500.2 X |
| 3,992,495 | 11/1976 | Saho et al. | 210/500.2 X |
| 4,046,843 | 9/1977 | Saho et al. | 264/22 |
| 4,147,745 | 4/1979 | Saho et al. | 210/500.2 X |
| 4,199,448 | 4/1980 | Johnson et al. | 210/500.2 X |

FOREIGN PATENT DOCUMENTS 5645482  7/1979  Japan .

OTHER PUBLICATIONS

Reich et al., Polymerization by Organometallic Compounds, Interscience Publishers, pp. 183 & 229–233.

*Primary Examiner*—Frank A. Spear, Jr.
*Attorney, Agent, or Firm*—McGlew and Tuttle

[57] ABSTRACT

A membrane for reverse osmosis comprising a porous base and a thin high polymer film attached to the porous base. The high polymer film includes at least one layer of radical polymer of nitrogen contained monomer and alkyl metal and at least one layer of polymer of nitrogen contained monomer which are alternately laminated on the porous base. The membrane is manufactured by combining the step of introducing nitrogen containing monomer, alkyl metal and the inert carrier gas into a plasma created by glow discharge to cause a radical polymerization reaction between nitrogen containing monomer and alkyl metal on the porous base disposed within the plasma, and the step of introducing in the plasma a nitrogen containing monomer and an inert carrier gas to cause polymerization of nitrogen containing monomer on the porous base.

7 Claims, 2 Drawing Figures

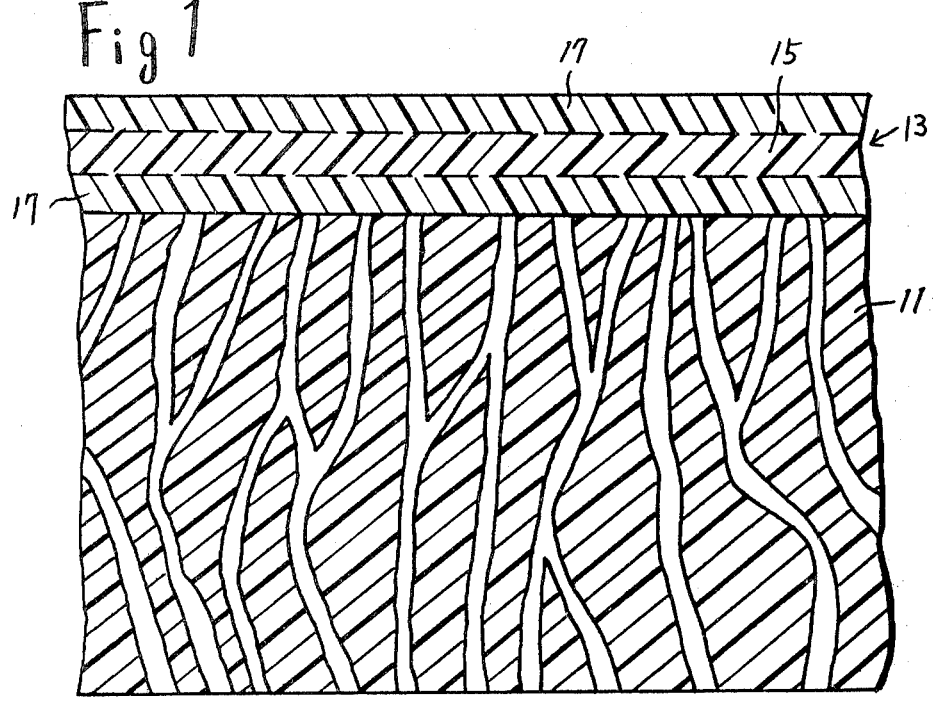
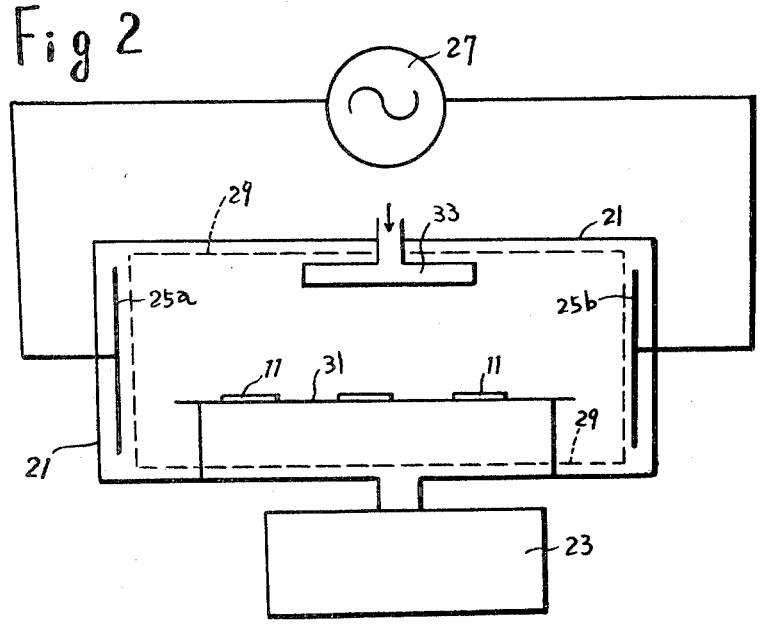

MEMBRANE FOR REVERSE OSMOSIS AND METHOD OF MAKING THE SAME

BACKGROUND OF THE INVENTION

This invention relates to membranes for reverse osmosis to be suitably used in desalination of sea water and treatment of waste water, and to a method for making the same.

Various synthetic membranes, in particular high polymer membranes are conventionally used for sea water desalination and waste water treatment through reverse osmosis. They include, for example, membranes made of acetyl cellulose, allyl amine polymer, 4-vinyl pyridine polymer, N-vinyl pyrrolidone polymer, 4-picoline polymer, 4-ethyl pyridine polymer, 4-methyl benzyl amine polymer, styrene polymer, glycydil methacrylate polymer, morpholine polymer, furane polymer. A problem with these conventionally used membranes is that extremely high pressure well over 80 kg/cm$^2$ must be applied to the saline or waste water for the desalination or waste water treatment. Among them, acetyl cellulose membranes have an additional drawback in that their desalination rate or removal rate is so low (e.g. less than 50%) that several reverse osmotic steps must be repeated to obtain desired results, for example, of desalting sea water. Although allyl amine polymer membranes and 4-vinyl pyridine polymer membranes exhibit high desalination rates (or removal rates) of 90% to 98%, they can transport only a small amount of aqueous solution, for example, 20–400 l/m$^2$ a day. By contrast, both morpholine and furane polymer membranes are capable of transporting a relatively large amount of aqueous solution, for example, more than 500 l/m$^2$ a day, but their desalination rates are as low as 30–50%.

In recent years, it has been proposed to use reverse osmotic membranes for separating an ionic substance from a non-ionic substance, for example, separating out sodium chloride from an aqueous solution of urea and sodium chloride. The above mentioned prior membranes cannot be used for this purpose since they primarily pass water and do not pass inorganic salts and non-ionic organic substances.

OBJECTS OF THE INVENTION

Accordingly, it is an object of this invention to provide membranes for reverse osmosis which are capable of passing aqueous solutions and removing ionic substances such as sodium chloride, inorganic salts of heavy metals at rates much higher than ever before.

It is another object of this invention to provide membranes for reverse osmosis which are capable of passing non-ionic substances such as urea, thiourea and alcohol thereby enabling separation of non-ionic substances and ionic substances.

It is a further object of this invention to provide a method for making reverse osmosis membranes of the type described in the above objects, wherein such membranes are produced with ease and high reproducibility.

These and other objects of this invention will be apparent from the accompanying drawings, the following detailed description and examples.

BRIEF DESCRIPTION OF THE DRAWINGS

FIG. 1 is an enlarged fragmentary view in cross section of a reverse osmosis membrane according to an embodiment of this invention; and FIG. 2 is a schematic view of an apparatus for use in practicing the method of this invention.

DETAILED DESCRIPTION OF THE INVENTION

Referring to the drawings, in particular to FIG. 1, there is provided, according to this invention, a membrane which basically includes a thin base 11 of porous material and a thin film 13 of high polymer material attached or applied to the porous base 11. The thin high polymer film 13 comprises at least one radical polymer layer 15 of nitrogen containing monomer and alkyl metal and at least one polymer layer 17 of nitrogen containing monomer which are alternately laminated. The high polymer film 13 illustrated in FIG. 1 includes one radical polymer layer 15 and two polymer layers 17 of nitrogen containing monomer which are stacked together in an alternate fashion.

A material suitable for the base 11 is porous cellulose acetate film which is marketed, for example, by Millipore Inc. under the name of "VSWP film". Other water permeable materials such as porous glass films and polysulfone films may also be used for the base 11.

Nitrogen containing monomers suitable for making a part of the high polymer film 13 may include polimerized compounds having nitrogen atoms such as alkene amines e.g. allyl amine, vinyl amine, allyl ethyl amine; alkene aromatic amines e.g. vinyl pyridine, N-vinyl pyrrolidone, allylpyrimidine, p-amino styrene; acryl amide compounds such as acryl amide, methacryl amide; nitrogen contained monomers which undergo ring breakage polymerization such as ethylene imine, methyl ethylene imine; and cyclic compounds such as caprolactame. Among these, alkene amines such as allyl amine are particularly preferred. Ethylene imine is also preferred.

Alkyl metals suitable for making a part of the high polymer film 13 may include alkyl zinc such as diethyl zinc; alkyl aluminum such as triisobutyl aluminum; alkyl magnesium such as diethyl magnesium; and alkyl silane such as tetramethyl silane. Particularly preferred are alkyl zinc and alkyl aluminum.

The thin high polymer film is not limited to the three layer arrangement, as shown in FIG. 1. Namely, the number of layers may suitably be selected depending on a particular application.

It has been found that the reverse osmotic membranes of this invention show exceptionally great ability of removing ionic substances, for example, sodium chloride, inorganic salts of heavy metals such as copper, lead, zinc and cadmium. Specifically, they are capable of removing as much as 90% sodium chloride out of an aqueous solution of sodium chloride. Furthermore, they exhibit removing rates of more than 95% with respect to various inorganic salts such as copper sulfate, copper nitrate, nickel sulfate and ferrous sulfate.

The passage or transport rate of aqueous solutions through the present membranes is much greater than that of the prior membranes. Accordingly, the membranes of the invention effectively reduce the pressure to be applied to the desired reverse osmosis to approximately half as much as the pressure required for the conventional membranes.

It has been also found that the present reverse osmotic membranes, while being highly capable of removing ionic substances such as described above, allow non-ionic substances such as urea, thiourea and alcohol to pass there-through. This characteristic of the present membranes makes it possible to use them for separating ionic substances and non-ionic substances in an aqueous solution containing such ionic and non-ionic substances. One application of this nature is in an artificial kidney wherein the present membranes may be utilized to remove an aqueous solution of inorganic substances such as urea from blood while leaving salts in blood. Other applications for the present membranes as a separating means may be apparent to one skilled in the art.

The present membranes are highly alkali- and acid-resistant and can be used in solution conditions of pH 2 to 12.

The reason why the membranes of this invention have excellent characteristics of reverse osmosis as hereinabove explained is not readily apparent to the inventor. However, it is known to him that, since a high polymer film having a similar construction but comprising a porous base and a polymer layer of nitrogen containing monomer fails to show such excellent reverse osmotic characteristics, the excellence of the present membranes may presumably and largely be attributed to the nature of the radical polymer layers wherein coordination of alkyl metal caused by the coordination bond between the nitrogen atoms and alkyl metal during radical polymerization of nitrogen contained monomer and alkyl metal has produced well-crystallized, homogenous polymer layers.

According to another aspect of this invention, there is provided a method of making a membrane for reverse osmosis of the type described above wherein at least one porous base is placed in a plasma created by glow discharge, and a first polymerization reaction feed or material including nitrogen containing monomer, alkyl metal and an inert carrier gas, and a second polymerization reaction feed including nitrogen containing monomer and an inert carrier gas are alternately introduced into the plasma to alternately cause on the porous base a radical polymerization reaction between nitrogen containing monomer and alkyl metal and a polymerization reaction of nitrogen containing monomer. Argon gas may be suitably used as the inert carrier gas.

FIG. 2 shows schematically an apparatus for carrying out the method of this invention. As shown, the apparatus includes a vacuum vessel or receptacle 21 made of glass and a vacuum pump 23 suitably connected to the vacuum vessel 21 for creating a vacuum condition of, for example, less than $1 \times 10^{31\,5}$ Torr within the vacuum vessel 21. A pair of electrodes 25a and 25b are oppositely disposed in a spaced relation within the vacuum vessel 21 and are electrically connected to an AC power supply 27. The power supply 27 applies a high frequency AC voltage of, for example, 1-100 KHz, 300-1,000 V for the spaced electrodes 25a and 25b to cause a glow discharge therebetween, which in turn creates a plasma within the vacuum vessel 21. Also, disposed within the vacuum vessel 21 is a glass table 31 for supporting the porous base 11 in an electrically insulated state. In order to introduce first and second polymerization reaction feeds into the vacuum vessel 21, an inlet member 33 is provided in communication with the interior of the vacuum vessel.

In operation of the illustrated apparatus, the porous base 11 is placed on the glass table 31 and then the vacuum pump 23 is actuated to create a desired vacuum condition within the vacuum vessel 21. Thereafter, a high frequency AC potential is applied between the electrodes 25a and 25b by the power supply 27 thereby creating a plasma 29 within the vacuum vessel 21, while the first and second polymerization reaction feeds of predetermined quantities are alternately introduced through the inlet member 33 into the vacuum vessel 21.

With the high frequency AC potential being applied across the electrodes 25a and 25b, the interior of the plasma 29 is kept macroscopically in a low energy state and microscopically in a high energy state. Under the circumstances, as the first feed is introduced into the vacuum vessel 21, a radical polymerization reaction is carried out between the nitrogen containing monomer and the alkyl metal on the porous base 11 thereby forming a layer 15 (FIG. 1) of radical polymer. Similarly, as the second feed is introduced into the vacuum vessel 21, a polymerization reaction of the nitrogen containing monomer is caused on the porous base 11 forming a polymer layer 17 (FIG. 1) on the previously formed radical polymer layer 15. In this manner, a thin high polymer film 13 (FIG. 1) comprising alternately laminated layers of radical polymer between nitrogen containing monomer and alkyl metal and polymer of nitrogen containing monomer is integrally formed on the porous base 11, thus providing the membrane for reverse osmosis of the present invention.

It has been found that an extremely thin high polymer film 13 having a thickness in the order of 500–5,000 Å is readily formed on the porous base 11 according to the present method.

It has been also found that manufacturing reproducibility of the reverse osmotic membranes having distinct characteristics as pointed out above is much improved by using an inert gas containing ammonia gas as the carrier gas in the method of the present invention.

The reason why such an improvement in the manufacturing reproducibility is obtained by including ammonia gas in the inert carrier gas is not yet known. However, it is believed that the loss of amino radicals from nitrogen containing monomer during radical polymerization of the monomer and alkyl metal may be prevented by ammonia gas or the lost radicals are compensated for by ammonia gas.

Several examples of the invention are now described.

EXAMPLE 1

An apparatus similar to that shown in FIG. 2 was made, the vacuum vessel 21 of which had a volume of 35 l. As the porous base 11, a VSWP film sold by Millipore Inc. and having a thickness of 135μ was placed on the glass support 31 within the vacuum vessel 21. The vacuum pump 23 was then operated to create a vacuum condition of less than $1 \times 10^{-5}$ Torr within the vacuum vessel 21.

Thereafter, a second polymerization reaction feed comprising allyl amine having a partial pressure of 0.05 Torr and argon gas having a partial pressure of 0.1 Torr was introduced through the inlet member 33 into the receptacle 21. Full pressure (pressure within the vacuum vessel) was adjusted at 0.15 Torr, and while maintaining this pressure, a 5 KHz, 900 V AC potential was applied across the electrodes 25a and 25b to cause a glow discharge therebetween for three minutes whereby a plasma was created within the vacuum vessel 21. The discharge current through a cross section of the plasma was 0.35 mA/cm$^2$.

A first polymerization reaction feed comprising allyl amine of 0.05 Torr partial pressure, diethyl zinc of 0.1 Torr partial pressure and argon gas of 0.1 Torr partial pressure was introduced into the vacuum vessel 21 and a glow discharge was caused for two minutes under the same conditions as above.

Further, three batches of the second polymerization reaction feed and two batches of the first polymerization reaction feed, each having the same composition and partial pressure as above were alternately introduced into the vacuum vessel 21 beginning with the first batch of the second reaction feed and then the first batch of the first reaction feed. Upon introduction of each batch, a glow discharge was generated under the same conditions for four, two, four, two and three minutes respectively until all batches of the feed were supplied into the vacuum vessel in that alternate order.

In this manner, three layers of radical polymer of allyl amine and diethyl zinc and four layers of allyl amine polymer were laminated on the porous base 11 in an alternate fashion to provide a high polymer film of seven laminated layer construction and approximately 1,500 Å thick. The multi-layer high polymer film, by being securely and integrally attached to the porous base, completes a membrane for reverse osmosis.

Using a test apparatus of Bioengineering Inc., permeability tests were conducted on the membrane with respect to a 1% aqueous solution of sodium chloride, a mixed solution of 100 m mol/l of copper sulfate, 100 m mol/l of zinc sulfate and 100 m mol/l of cadmium sulfate, and a 0.03 mol/l urea solution. The test results obtained are listed in Table 1.

TABLE 1

| Solutions Tested | Pressure applied in kg/cm² | Amount of aqueous solution through membrane in l/m² day | Removal rate in % |
|---|---|---|---|
| Sodium chloride | 55 | 883 | 97.0 |
| Mixture of copper sulfate, zinc sulfate, cadmium sulfate | 55 | 1,661 | 98.0(Cu) 98.9(Zn) 98.4(Cd) |
| Urea | 55 | 620 | 4.5 |

As it is apparent from the table, the membrane of this Example has a high desalination rate, passes a large amount of aqueous solution and effectively operates under a much reduced pressure. It also shows a high passage rate with respect to the urea solution.

EXAMPLE 2

The apparatus of Example 1 was used and a porous base as that employed in Example 1 was placed on the glass support 31. A vacuum of less than $1 \times 10^{-5}$ Torr was created within the vacuum vessel 21 by the vacuum pump 23. With the full pressure adjusted between 0.20–0.25 Torr, two batches of a first polymerization reaction feed and three batches of the second polymerization reaction feed were alternately supplied into the vacuum vessel 21 starting with the second reaction feed batch and then the first reaction feed batch. The first reaction feed comprised allyl amine of 0.1 Torr partial pressure, argon gas of 0.1 Torr and triisobutyl aluminum of 0.05 Torr partial pressure, while the second reaction feed comprised of allyl amine of 0.1 Torr partial pressure and argon gas of 0.1 Torr partial pressure. Upon introduction of each feed batch, a glow discharge was caused under the same conditions as in Example 1 for three, two, one, one and two minutes respectively until all the batches were alternately introduced into the vacuum vessel 21.

As a result, three allyl amine polymer layers and two layers of radical polymer of allyl amine and triisobutyl aluminum were laminated in an alternate fashion on the porous base 11 to provide a high polymer film approximately 1,000 Å thick. The multi-layer high polymer film was securely and integrally attached to the porous base thereby completing a membrane for reverse osmosis.

Using the test apparatus of Example 1, the permeability tests were conducted on the membrane with respect to a 1% aqueous solution of sodium chloride and a mixture of 100 m mol of copper sulfate, 100 m mol of Lead sulfate and 100 m mol of Zinc sulfate dissolved in 1 l of pure water and 0.03 mol/l urea solution. The test results obtained are listed in Table 2.

TABLE 2

| Test solutions | Pressure applied in kg/cm² | Amount of aqueous solution through membrane in l/m² day | Removal rate in % |
|---|---|---|---|
| Sodium chloride | 55 | 510 | 92.9 |
| Mixture of copper sulfate, Lead sulfate, Zinc sulfate | 55 | 246 | 89.5(Cu) 89.4(Pb) 89.0(Zn) |
| Urea | 55 | 650 | 3.5 |

As it is understood from Table 2, the membrane of this example is slightly inferior in its overall characteristics to that of Example 1. However, the membrane has a distinct advantage over the prior membranes in that it operates at a lower pressure and has a relatively high aqueous solution passing ability and removal rate.

EXAMPLE 3

In the apparatus of Example 1, a porous base as in Example 1 was placed on the glass support and a vacuum of less than $1 \times 10^{-5}$ Torr was generated within the vacuum vessel. While keeping the full pressure between 0.25–0.35 Torr, five batches of a first polymerization reaction feed comprising allyl amine of 0.05 Torr partial pressure, diethyl zinc of 0.1 Torr partial pressure, argon gas of 0.1 Torr partial pressure and ammonia gas of 0.1 Torr partial pressure, and six batches of a second polymerization reaction feed comprising allyl amine of 0.05 Torr partial pressure, argon gas of 0.1 Torr partial pressure and ammonia gas of 0.1 Torr partial pressure were alternately introduced into the vacuum vessel beginning with a batch of the second reaction feed. Upon introduction of each of eleven batches, a glow discharge was caused sequentially for three, two, two, two, two, two, two, two, two, two, and nine minutes. The conditions under which such sequential glow dicharge was produced were substantially the same as in Example 1 except that a potential of 800 V was applied across the electrodes.

As a result, six layers of allyl amine polymer and five layers of allyl amine and diethyl zinc were securely and alternately laminated on the porous base to form an eleven-layer high polymer film which together with the porous base completed a membrane for reverse osmosis.

Using the same test apparatus as in Example 1, permeability tests were carried out on the membrane with respect to various solutions. Test results are listed in Table 3.

TABLE 3

| Test substances | Concentration of solutions in mol/l | Amount of aqueous solution through membrane in l/m² day | Applied pressure in kg/cm² | Removal rate in % |
|---|---|---|---|---|
| Urea | 0.03 | 580 | 55 | 4.0 |
| Thiourea | 0.03 | 670 | 55 | 5.6 |
| Sodium chloride | 0.17 | 660 | 55 | 95.0 |
| Lithium chloride | 0.01 | 710 | 55 | 95.3 |
| Calcium chloride | 0.01 | 740 | 55 | 95.7 |
| Magnesium chloride | 0.01 | 720 | 55 | 94.1 |
| Barium chloride | 0.01 | 750 | 55 | 94.0 |
| Copper sulfate | 0.01 | 740 | 55 | 96.0 |
| Zinc chloride | 0.01 | 760 | 55 | 96.0 |
| Cadmium chloride | 0.01 | 740 | 55 | 95.0 |
| Lead nitrate | 0.01 | 760 | 55 | 95.0 |
| Nickel sulfate | 0.01 | 750 | 55 | 96.9 |
| Ferrous sulfate | 0.01 | 780 | 55 | 97.5 |
| Mixture of | | 980 | 55 | |
| methyl acetate | 0.013 | | | 70.6 |
| ethyl acetate | 0.01 | | | 76.0 |
| butyl acetate | 0.007 | | | 78.0 |
| Mixture of | | 1,060 | 55 | |
| methyl alcohol | 0.025 | | | 12.2 |
| ethyl alcohol | 0.017 | | | 24.4 |
| isopropyl alcohol | 0.013 | | | 45.8 |
| butyl alcohol | 0.011 | | | 38.7 |

It is apparent from Table 3 that the membrane exhibits a very high removing ability as well as a high aqueous solution transport ability at relatively low operating pressures with respect to inorganic salts; it shows a very high permeability with respect to urea and thiourea; it shows higher permeability to alcohol of lower molecule; and while allowing esters to pass, it also removes them at a relatively high rate.

EXAMPLE 4

Ten membranes were prepared in accordance with Example 3 (hereinafter referred to as type A membranes) and another ten membranes were prepared substantially in accordance with Example 3 (type B membranes) except that ammonia gas was included neither in the first polymerization reaction feed nor in the second polymerization reaction feed.

Using the same testing apparatus as in Example 1, permeability tests were conducted on both type A and type B membranes. A salt solution of 0.17 mol/l was utilized for the test and a pressure of 55 kg/cm² was applied to the test solution. The removal rates (desalination rates) of the tested membranes are listed in Table 4.

TABLE 4

| Test No. | Type A membranes | Type B membranes |
|---|---|---|
| 1 | 91.0 | 60.5 |
| 2 | 94.5 | 61.0 |
| 3 | 87.0 | 83.0 |
| 4 | 99.0 | 94.0 |
| 5 | 98.5 | 97.5 |
| 6 | 98.0 | 79.0 |
| 7 | 86.0 | 72.5 |
| 8 | 80.5 | 50.5 |
| 9 | 99.5 | 85.0 |
| 10 | 99.0 | 89.5 |

As it is understood from the table, among ten type B membranes, three are considered unacceptable and two barely acceptable in view of their desalination rate.

On the other hand, all of the type A membranes are quite acceptable although three of them show desalination rates of 80% level in contrast to the remaining membranes which have desalination rates of 90% level.

It may be concluded from this fact that reverse osmotic membranes of excellent characteristic are successfully produced with much improved reproducibility by including ammonia gas in the carrier gas.

An elemental analysis of the type A and B membranes has shown that the type A membrane includes in percent by weight the following elements: C:59.83, H:6.43, N:22.15, and others: 11.59. The type B membranes includes in percent by weight the following elements: C:58.17, H:6.33, N:14.50 and others: 21.00.

It is noted that the type A membrane contains relatively large quantity of nitrogen, which suggests that the addition of ammonia gas is quite effective in the production of a high quality membrane with improved reproducibility.

What is claimed is:

1. A method of making a membrane for reverse osmosis which is capable of passing non-ionic substance and blocking the passage of ionic substances and which comprising a porous base and a thin high polymer film attached to said porous base, said thin high polymer film including at least one layer of radical polymer of nitrogen containing monomer and alkyl metal and at least one layer of polymer of nitrogen containing monomer which are alternately laminated together, said method comprising the steps of: placing at least one porous base in a plasma created by glow discharge; and introducing alternately a first polymerization reaction feed including nitrogen containing monomer, alkyl metal and an inert carrier gas and a second polymerization reaction feed including nitrogen containing monomer, an inert carrier gas and no alkyl metal into said plasma to alternately cause on said porous base a radical polymerization reaction between nitrogen containing monomer and alkyl metal and a polymerization reaction of nitrogen containing monomer.

2. A method as defined in claim 1, wherein said porous base comprises a porous film of acetic cellulose.

3. A method as defined in claim 1, wherein said nitrogen containing monomer comprises at least one of the group of alkene amines.

4. A method as defined in claim 1, wherein said alkyl metal comprises either alkyl zinc or alkyl aluminum.

5. A method as defined in claim 1, wherein said inert carrier gas comprises argon gas.

6. A method as defined in claim 1, wherein said inert carrier gas further includes ammonia gas.

7. A method of using a membrane according to claim 1, for reverse osmosis comprising supplying an aqueous solution of ionic and non-ionic substance to one side of said membrane to separate the ionic substances from the non-ionic substances, the non-ionic substances passing through said membrane and the ionic substances being blocked from passage to said membrane.

* * * * *